United States Patent [19]

Otani et al.

[11] 3,758,738
[45] Sept. 11, 1973

[54] TEMPERATURE MEASURING APPARATUS FOR HEATING ROLLER

[75] Inventors: Sigeru Otani; Fuminori Honda, both of Mihara; Kiyoto Mitani, Fukuyama, all of Japan

[73] Assignee: Teijin Limited, Osaka-shi, Osaka, Japan

[22] Filed: July 6, 1972

[21] Appl. No.: 269,463

[30] Foreign Application Priority Data
Oct. 6, 1971    Japan ..... 46/091896 (utility model)

[52] U.S. Cl......... 219/10.49, 219/10.61, 219/10.75, 219/471
[51] Int. Cl. .............................................. H05b 5/00
[58] Field of Search ...................... 219/10.49, 10.75, 219/10.77, 10.61, 469, 471, 504; 73/351, 362 AR, 339 A

[56] References Cited
UNITED STATES PATENTS
3,303,701   2/1967   Matsuura et al. ...................... 73/351
3,463,893   8/1969   Chitu ........................... 219/10.75 X Primary Examiner—J. V. Truhe
Assistant Examiner—B. A. Reynolds
Attorney—E. F. Wenderoth et al.

[57]    ABSTRACT

A quartz crystal resonator is embedded in a circumferential wall portion of a heating roller. The heating roller is provided with a rotary electrode, while a stationary electrode is mounted to a stationary portion of the apparatus to form a rotary air capacitor in cooperation with the rotary electrode. The quartz crystal resonator has two terminals, one of which is grounded and the other of which is connected to an oscillation circuit through the air capacitor variation of impedance of the detector to the outside of the heating roller without any mechanical contact with the latter.

2 Claims, 5 Drawing Figures

TEMPERATURE MEASURING APPARATUS FOR HEATING ROLLER

This invention relates to a temperature measuring apparatus for a rotatable heating roller used for heating treatments of synthetic fibers.

Many thermo-plastic synthetic fibers, such as polyester and polyamide, are usually heat-treated, for example drawn, while they are wound on a metalic heated rotary body. The temperature of the surface of the rotary body should be maintained exactly at a predetermined value. For that purpose, it has been proposed to correctly detect the temperature of the rotary body as electric signals which are taken out of the rotary body and supplied to a controller. As the most preferable temperature detectors, a thermistor or thermocouple are employed, which are embedded in a circumferential wall portion of the rotary body to detect electrically the temperature most similar to the exact temperature of the surface of the rotary body. The detected signals have been generally taken out of the rotary body by use of a slip ring. In such apparatus, however, the electric signals taken out are not always constant because of the fluctuation of electric impedance due to contact resistance which is caused by wearing of the slip ring and the contact point where a brush is in contact with the slip ring, and also by deposition of dust thereon. Thus, there sometimes occurs a critical error and a noise signal, which make it impossible to effect an accurate temperature control.

The disadvantages described above have suggested several electrical coupling means which facilitate to take the electrical signals out of the rotary body without any mechanical contact therewith. Typical and well known electrical coupling means of dielectric couplings by transformers and electrostatic couplings by rotary capacitors.

In U.S. Pat. No. 3,463,893, it has been proposed to provide the above mentioned electric coupling means at a shaft of a heating roller, and, in U.S. Pat. No. 3,417,219, a dielectric coupling means is provided in a heating body of a heating roller. In the former arises a disadvantage that the shaft must be made longer and a tunnel must be provided in the shaft to allow lead wires to be threaded therethrough, so that such temperature control apparatus is not suited for use with a drawing machine having multiple spindles. The latter provides a dielectric coupling means comprising two opposite cores each coiled by a lead wire. These two cores are provided in a stationary heating body and a roller, respectively, concentrically with the driving shaft. Accordingly, there is no disadvantage such as experienced in the apparatus of the former U.S. Patent. However, when such dielectric heating method is applied, magnetic flux passes through the cores described above to disturb the electrical signals. Therefore, additional means for preventing the disturbance of electrical signals for temperature control are needed, and since the stationary core and the rotatable core constituting the rotary transformer should be accurately provided in the heating body and the roller, respectively, the structure becomes complicated and manufacturing cost and maintaining cost go higher. Moreover, the rotary transformer cannot be made to be small because of necessary heat-proofing, and it has a basic disadvantage rather than the rotary air capacitor.

Nowadays numerous heating rollers are concentrically controlled by a plurality of switching system in which output signals of the detectors installed in each temperature detecting circuit are required to be of the same value at the same temperature with one another. When a quartz crystal resonator is used as temperature detector, the quartz crystal resonator is so smal' that it can be embedded in a preferable position of the circumferential wall of the heating roller, and the quartz crystal resonator has an advantage that it may allow its oscillation frequency to change almost linearly in accordance with a temperature variation.

Accordingly, an object of the present invention is to provide a temperature measuring apparatus simple in structure and easy to make and to maintain, wherein the temperature detector embedded in the circumferential wall of the rotary body is associated with the electrical circuits provided out of the rotary body by electrostatic coupling mean without mechanical contact.

According to the present invention, a temperature measuring apparatus is provided comprising a cup-shaped heating rotary body having a quartz crystal resonator embedded in a circumferencial wall portion thereof, and a rotary air capacitor having a rotary electrode and a stationary electrode, one of two terminals of said resonator being connected with the rotary body which is grounded and the other terminal being connected with the rotary electrode provided at an open end wall portion of the heating rotary body through an electrical insulating material, said stationary electrode being mounted through an electrical insulating material to a stationary portion of the apparatus in such a manner that said stationary electrode is opposite to said rotary electrode with an air gap therebetween. The quartz crystal resonator is connected to a circuit through the rotary air capacitor to form an oscillation circuit which is grounded.

By the apparatus described above, the temperature of the heating rotary body is detected as the ferquency of the oscillation circuit. The word "ground" used herein means to form a short circuit by electrically connecting to a frame of the apparatus.

The two electrodes may be disk-like shapes attached to a flange end of a stationary frame which supports the cup-like rotary body and to rearward end surface of the rotary body, respectively. The two electrodes also may be cylindrical shapes attached to an outer circumferential surface of the flange and an inner circumferential surface of the rotary body, respectively, or attached to a cylindrical inner circumferential surface of the flange and an outer circumferential surface of the rotary body. Insulating materials for the electrodes can preferably be fixed integrally to the circumferential wall portion of the rotary body and the stationary flange portion where the electrodes are attached. However, these insulating materials may be removably mounted thereto.

Both electrodes have relatively large opposing areas, so that the rotary air capacitor of the present invention can have a relatively large electrostatic capacity. This means that the rotary air capacitor has a relatively low impedance for the frequency of the oscillation circuit. Therefore, even if there is some fluctuation of the space between the electrodes of the rotary air capacitor, the variance of the capacity of the rotary air capacitor due to such fluctuation will hardly affect the ferquency of the oscillation circuit determined by the natural oscillation of the quartz crystal resonator which is responsive to temperature.

In the present invention, the rotary electrode of the rotary air capacitor is attached to the open end portion of the rotary body, so that the quartz crystal resonator is connected to the rotary electrode by a lead wire extending along the circumferential wall of the rotary body. Such structure of the present invention does not require any axial bore in the driving shaft through which the lead wire of the conventional apparatus has passed.

Thus, the apparatus of the present invention will be cheaper to manufacture and easier to maintain. Furthermore, there is no fear that the lead wire will be cut or moved out of place when the rotary body is removed from the driving shaft.

The oscillation frequency $F_1$ may be used directly or indirectly, after converting to pulses or voltage signals, to indicate the temperature of the heating roller or to control the temperature thereof. In order to convert the oscillation frequency $F_1$ to a lower frequency, preferably, another oscillation circuit of the same kind as the above described oscillation circuit is provided, and the signals of the two oscillation circuits are induced to a mixing circuit to take out the frequency of difference between the oscillation frequencies.

The aforementioned and other objects and features of the present invention will become apparent from the description of specific embodiments thereof, when read in conjunction with the accompanying drawings in which.

Figure 1:
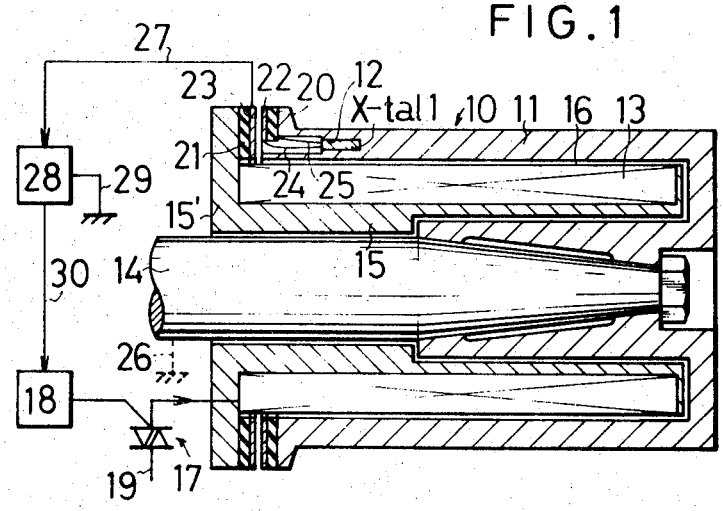
FIG. 1 is a sectional view showing a principal portion of a temperature control apparatus for a heating roller according to the present invention.

In a first embodiment of the present invention shown in FIG. 1, reference numeral 10 designates a cup-like heating roller having a hollow recess opening at one side to receive a stationary iron core 15 therein. The heating roller 10 also has a narrow recess 12 in its circumferential wall portion 11, in which a quartz crystal resonator X-tal 1 is snugly contained. A driving shaft 14 of the roller 10 is rotatably supported by a stationary frame portion (not shown) to rotate by a suitable driving means. Induction heating coil 13 is mounted to a stationary iron core 15 with an air gap 16 from the inner circumferencial wall portion of the cup-like roller 10. The induction heating coil 13 is connected with a power source by conductive wire 19 through Triode AC Switch 17 operated by a controller. Electrical insulating rings 20 and 21 made of 10mm thick steatite are provided at a rear end surface of the roller 10 and a flange end surface of the iron core 15 to oppose each other with a space of 1.0mm therebetween. These insulating rings are provided with electrodes 22 and 23 of silver of $10\mu$ thickness formed by silver baking.

Of two lead wires 24 and 25 of the quartz crystal resonator X-tal 1, the lead wire 24 is connected with the electrode 22 which is rotated together with the roller 10 but insulated therefrom and the other lead wire 25 is electrically connected with the roller 10 which is grounded through the shaft 14 and bearings (not shown). Numeral 26 shows that the roller is substantially grounded. The stationary electrode 23 is connected with an external circuit 28 through the lead wire 21. Numeral 29 shows that the oscillation circuit 28 is grounded through the frame of the apparatus, which means that the oscillation circuit 28 is electrically connected with the lead wire 25 of the quartz crystal resonator X-tal 1.

According to the first embodiment of the present invention described above, the quartz crystal resonator X-tal 1 is connected to the oscillation circuit in the external circuit 28 through a rotary air capacitor Cs without a mechanical contact. The output frequency from the oscillation circuit is led to a controller 18 by way of a lead wire 30 to control the temperature of the roller 10.

Figure 2:
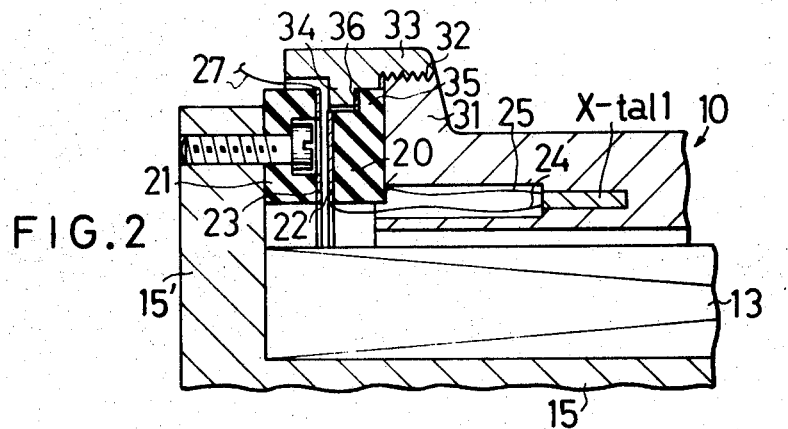
FIG. 2 to FIG. 4 are sectional views showing temperature detecting means for the heating roller according to the present invention.

In a second embodiment of the present invention shown in FIG. 2, an electrically insulating ring 20 on which the electode 22 is attached is removably mounted to the roller 10. Namely, screw threads are provided on the rear circumferential flange portion 31 of the roller 10, and clamping piece 33 such as a cap nut is engaged to the screw threads. A stepped portion 34 of the clamping piece 33 contacts at its inner surface with an outer stepped surface of the electrically insulating ring 20 through a packing 36 interposed therebetween, thus fixing the ring 20 to the rear end surface of the roller 10.

In place of the flat ring-shaped electrodes 22 and 23 shown in the above embodiment, two cylindrical electrodes arranged concentrically may be employed.

Figure 3:
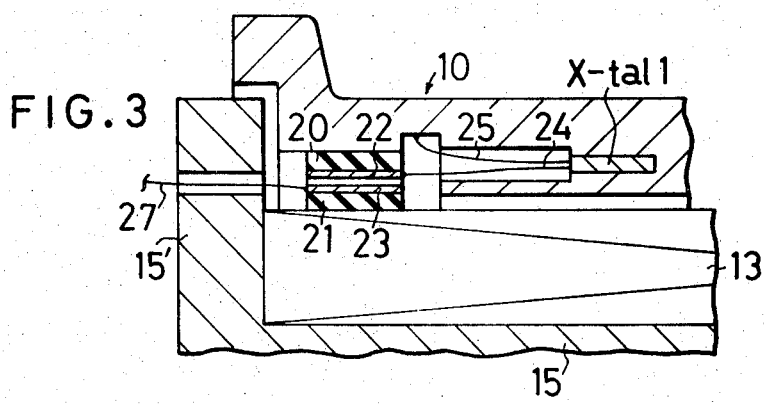
Figure 4:
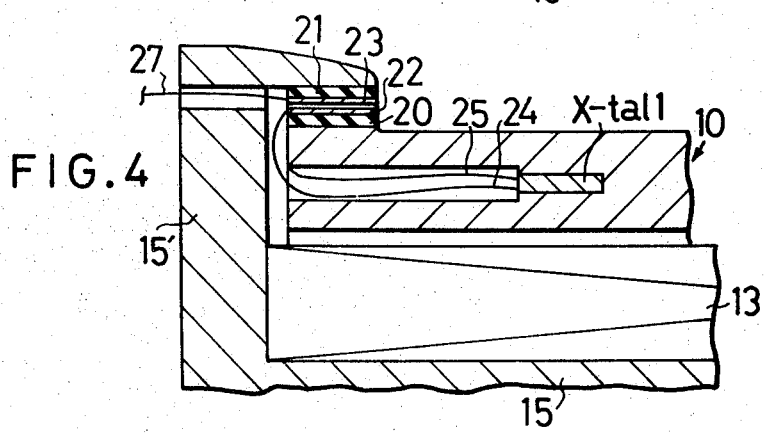

In a third embodiment of the present invention shown in FIG. 3, cylindrical electrodes 22 and 23 are provided at the inner circumferential surface near the free open end of the roller 10 and the outer circumferential surface of the induction heating coil 13, respectively. In a fourth embodiment of the present invention shown in FIG. 4, the cylindrical electrodes are provided at the outer circumferential surface of the roller and the inner circumferential surface of the flange 15 of the stationary frame, respectively. These electrodes 22 and 23 are formed by metal spraying on the electrically insulating meterials 20 and 21 which are also formed by ceramic spraying.

Figure 5:
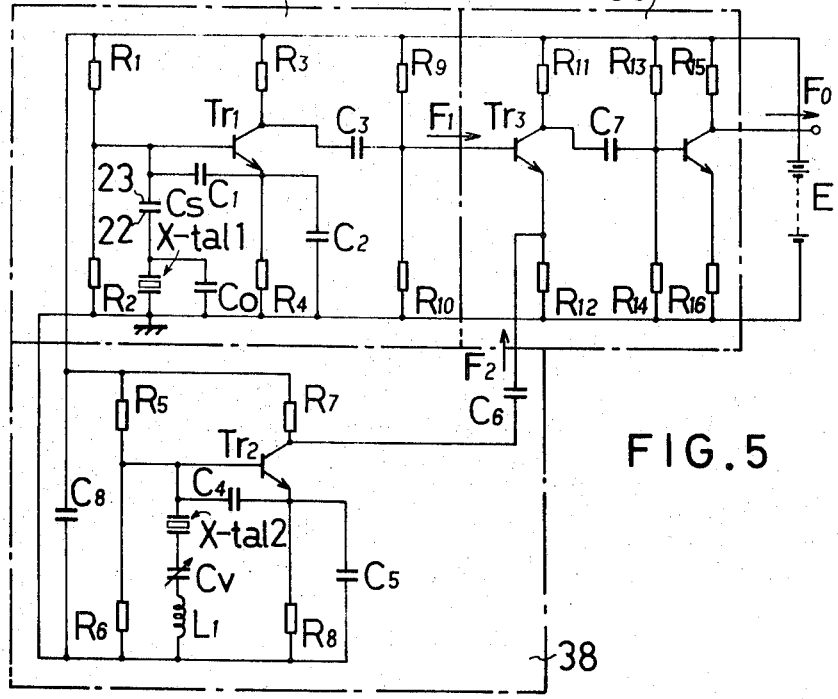
FIG. 5 is a circuit diagram showing an external electric oscillation circuit of the present invention.

FIG. 5 shows, in detail, the external circuit disignated by reference numeral 28 in the first embodiment of the present invention. The external circuit comprises a temperature detecting frequency oscillation circuit 37, a reference frequency oscillation circuit 38, and a mixing circuit 39.

As described before, the lead wire 25 of the quartz crystal resonator X-tal embedded in the rotary body is grounded, and the other lead wire 24 is connected with the rotary electrode 22 which forms the rotary air capacitor Cs in cooperation with the stationary electrode 23 connected with the feedback input side of the temperature detecting colpitts frequency oscillation circuit 37. The oscillation frequency $F_1$ of this circuit 37 is determined by the natural oscillaiton of the quartz crystal resonator X-tal 1. That is, the oscillation frequency $F_1$ varies in response to the temperature of the rotary body as sensed by X-tal 1. The output frequency $F_1$ and $F_2$ of the two oscillation circuits 37 and 38 are led into the mixing circuit 39 to generate the deviation Fo therebetween, i.e. Fo = $F_1 - F_2$. The output frequency Fo which corresponds to the temperature of the roller 10 is applied to the controller 18 through the lead wire 3. The oscillation circuits 37 and 38 and the mixing circuit 39 are known circuits except for the provision of the rotary air capacitor Cs and equivalent capacitance Co for peripheral portions to which the rotary air capacitor is mounted, and except for the series arrangement of a compensation coil L1 and a variable condenser Cv to a reference quartz crystal resonator X-tal 2. Accordingly, detailed description of these circuits are omitted.

According to the arrangement in which the reference quartz crystal resonator X-tal 2 is connected, in series, with the compensation coil L1 and the variable condenser Cv, the value of the output frequency Fo can be easily adjusted by operating the variable condenser Cv. For example, using the quartz crystal resonators X-tal 1 and X-tal 2 both being about 8MHz at room temperature and connected to the compensation coil L1 of about 60 $\mu$ H, when the variable condenser Cv is varied from 4.2PF to 37.8 P F, the output frequency Fo varies from 63.6KHz to 24.9Hz while the heated roller is at about 100° C.

Though the coil L1 and the variable condenser Cv are connected in series with the reference quartz crystal resonator X-tal 2, they may be connected in series with the detecting quartz crystal resonator X-tal 1. Such connection will have the same effects as mentioned above.

While the invention has been explained and described with the aid of particular embodiments thereof, it will be understood that the invention is not limited thereby and that many retaining and utilizing the spirit thereof without departing essentially therefrom will occur to those skilled in the art in appling the invention to specific operating environments and conditions. For example, in place of the heating induction coil 13 mounted to the iron core 15, a casting heater may be fixed to the roller 10.

What is claimed is:

1. In a rotary heating roller apparatus comprising a cup-like rotary body, a driving shaft removably connected at an opened portion of said rotary body and a stationary heating means disposed with an air gap between the inner circumferential surface of said rotary body and the outer circumferential surface of said heating means, an improved temperature measuring apparatus comprising a temperature detector embedded in a circumferential wall portion of said rotary body, and an electrostatic coupling means which electrically connects said temperature detector to an external circuit without mechanical contact, said electrostatic coupling means comprising a rotary air capacitor comprising an annular disc-like rotary electrode attached to an annular open end surface of said rotary body with an electrical insulating material therebetween, and an annular disk-like stationary electrode attached to a stationary portion of said roller apparatus with an electrical insulating material therebetween, said stationary electrode being positioned opposite said rotary electrode; said temperature detector being a quartz crystal resonator having two terminals, one of said terminals being connected with said rotary body which is grounded through said driving shaft, the other terminal thereof being connected with said rotary electrode; and said external circuit having an oscillation circuit which includes said quartz crystal resonator, whereby the temperature of said rotary body can be detectd as the frequency of said oscillation circuit.

2. In a rotary heating roller apparatus comprising a cup-like rotary body, a driving shaft removably connected at an opened portion of said rotary body and a stationary heating means disposed with an air gap between the inner circumferential surface of said rotary body and the outer circumferential surface of said heating means, an improved temperature measuring apparatus comprising a temperature detector embedded in a circumferential wall portion of said rotary body, and an electrostatic coupling means which electrically connects said temperature detector to an external circuit without mechanical contact, said electrostatic coupling means comprising a rotary air capacitor comprising a cylindrical rotary electrode attached to a circumferential wall portion of said rotary body with an electrical insulating material therebetween, and a cylindrical stationary electrode attached to a stationary portion of said roller apparatus with an electrical insulating material therebetween, said stationary electrode being positioned opposite to said rotary electrode; said temperature detector being a quartz crystal resonator having two terminals, one of said terminals being connected with said rotary body which is grounded through said driving shaft, the other terminal thereof being connected with said rotary electrode; and said external circuit having an oscillation circuit which includes said quartz crystal resonator, whereby the temperature of said rotary body can be detected as the frequency of said oscillation circuit.

* * * * *